United States Patent
Zitlaw et al.

(10) Patent No.: US 7,272,709 B2
(45) Date of Patent: Sep. 18, 2007

(54) USING CHIP SELECT TO SPECIFY BOOT MEMORY

(75) Inventors: Cliff Zitlaw, San Jose, CA (US); Frankie F. Roohparvar, Milpitas, CA (US); David Eggleston, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 484 days.

(21) Appl. No.: 10/329,904

(22) Filed: Dec. 26, 2002

(65) Prior Publication Data
US 2004/0128425 A1    Jul. 1, 2004

(51) Int. Cl.
*G06F 9/445* (2006.01)

(52) U.S. Cl. ............................ 713/2; 713/1; 711/166

(58) Field of Classification Search .................. 713/2
See application file for complete search history.

(56) References Cited

U.S. PATENT DOCUMENTS

| | | | |
|---|---|---|---|
| 4,462,080 A * | 7/1984 | Johnstone et al. | ......... 704/200 |
| 5,991,875 A | 11/1999 | Paul | |
| 6,112,267 A | 8/2000 | McCormack et al. | |
| 6,182,187 B1 * | 1/2001 | Cox et al. | ............ 711/5 |
| 6,202,133 B1 | 3/2001 | Jeddeloh | |
| 6,246,626 B1 | 6/2001 | Roohparvar | |
| 6,278,654 B1 | 8/2001 | Roohparvar | |
| 6,304,497 B1 | 10/2001 | Roohparvar | |
| 6,366,521 B1 | 4/2002 | Roohparvar | |
| 6,438,068 B1 | 8/2002 | Roohparvar | |
| 6,456,542 B1 | 9/2002 | Roohparvar | |
| 2001/0005324 A1 | 6/2001 | Chevallier | |
| 2003/0154370 A1 * | 8/2003 | Lai et al. | ............ 713/2 |

OTHER PUBLICATIONS

Microsoft Computer Dictionary, Second Edition, Microsoft Press, 1993, p. 58.*
White, Ron. How Computers Work. 1994, Ziff-Davis Press. pp. 7 and 14.*

* cited by examiner

Primary Examiner—B. James Peikari
(74) Attorney, Agent, or Firm—Leffert, Jay & Polglaze P.A.

(57) ABSTRACT

A synchronous Flash memory device is described that enhances initialization and boot memory device identification in synchronous memory systems. A boot memory is typically a separate device that is tied to a specific chip select line and/or address range of a system, whereas synchronous Flash memory generally can be placed in any available memory slot and assigned one of several possible chip selects and address ranges. This lack of predictability makes installing a boot memory based on a non-volatile synchronous memory device difficult. A synchronous Flash boot memory device of the detailed invention is adapted to identify itself and its chip select/address range to the memory controller at power up, reset, or upon receiving an identification request. This allows the utilization of the detailed synchronous Flash memory as a boot memory in synchronous systems where a reserved boot memory slot and/or chip select are not provided.

86 Claims, 5 Drawing Sheets

USING CHIP SELECT TO SPECIFY BOOT MEMORY

TECHNICAL FIELD OF THE INVENTION

The present invention relates generally to integrated circuits and in particular the present invention relates to power up initialization of boot memory devices.

BACKGROUND OF THE INVENTION

Memory devices are typically provided as internal storage areas in the computer. The term memory identifies data storage that comes in the form of integrated circuit chips. There are several different types of memory used in modern electronics, one common type is RAM (random-access memory). RAM is characteristically found in use as main memory in a computer environment. RAM refers to read and write memory; that is, you can both write data into RAM and read data from RAM. This is in contrast to ROM, which permits you only to read data. Most RAM is volatile, which means that it requires a steady flow of electricity to maintain its contents. As soon as the power is turned off, whatever data was in RAM is lost.

Computers almost always contain a small amount of read-only memory (ROM) that holds instructions for starting up the computer. Unlike RAM, ROM cannot generally be written to. An EEPROM (electrically erasable programmable read-only memory) is a special type non-volatile ROM that can be erased by exposing it to an electrical charge. Like other types of ROM, EEPROM is traditionally not as fast as RAM. EEPROM typically comprise a large number of memory cells having electrically isolated gates (floating gates). Data is stored in the memory cells in the form of charge on the floating gates. Charge is transported to or removed from the floating gates by programming and erase operations, respectively.

Yet another type of non-volatile memory is a Flash memory. A Flash memory is a type of EEPROM that can be erased and reprogrammed in blocks instead of one byte at a time. Many modern personal computers (PCs) and processor based systems have their basic input/output system (BIOS) code stored on a Flash memory chip so that it can easily be updated if necessary. Such a BIOS is sometimes called a Flash BIOS. In a PC or processor based system, the memory that stores the BIOS code is typically called the "boot memory", as it is usually the first code that the processor executes upon reset or power up. The code the boot memory contains initializes the system, sets up basic environmental variables and interrupt vectors, initializes peripherals, and, finally, loads and begins execution of the operating system (OS) or main executable of the PC or processor based system.

A typical Flash memory comprises a memory array, which includes a large number of memory cells. Each of the memory cells includes a floating gate field-effect transistor capable of holding a charge. The cells are usually grouped into blocks. Each of the cells within a block can be electrically programmed in a random basis by charging the floating gate. The charge can be removed from the floating gate by a block erase operation. The data in a cell is determined by the presence or absence of the charge in the floating gate.

A synchronous DRAM (SDRAM) is a type of DRAM that can run at much higher clock speeds than conventional DRAM memory. SDRAM synchronizes itself with a CPU's bus and is capable of running at 100 MHZ, 133 MHZ, 166 MHZ, or 200 MHZ, about three or more times faster than conventional FPM (Fast Page Mode) RAM, and about twice as fast EDO (Extended Data Output) DRAM and BEDO (Burst Extended Data Output) DRAM. An extended form of SDRAM that can transfer a data value on the rising and falling edge of the clock signal is called double data rate SDRAM (DDR SDRAM, or simply, DDR). SDRAM's can be accessed quickly, but are volatile. Many computer systems are designed to operate using SDRAM, but would benefit from non-volatile memory. A synchronous Flash memory (Also referred to as a SyncFlash) has been designed that allows for a non-volatile memory device with an SDRAM interface. Although knowledge of the function and internal structure of a synchronous Flash memory is not essential to understanding the present invention, a detailed discussion is included in U.S. patent application Ser. No. 09/627,682 filed Jul. 28, 2000 and titled, "Synchronous Flash Memory," which is commonly assigned and incorporated by reference.

In general, the goal of synchronous Flash is to mimic the architecture of SDRAM. It has an SDRAM interface which is compatible to SDRAM for read operation to the synchronous Flash memory. Programming, erasing, block protection and other Flash specific function differ from SDRAM and are performed with a three cycle SDRAM command sequence.

Generally, addressing in conventional memory subsystems is accomplished by a combination of the internal address decoding of individual memory devices, external address decoding, and/or chip select lines. Each memory device typically contains its own internal address decoding that decodes the requested memory access placed on the address lines of the memory device and allows access to the requested memory data words of the internal memory array that are being addressed. External addressing that places parts or all of the internal address range of a memory device into the physical address range of the memory subsystem is typically done by external decoders and/or by the utilization of chip select lines. External decoders are similar to and extend the internal decoders of the memory device(s). They decode the extended address that the memory subsystem receives for an individual memory access that is typically beyond the full address range of an individual memory device. They also map the individual memory device or portion of an individual memory device address range into the physical address range of the memory subsystem. Chip select lines can also be used to map memory devices into the physical address range of the memory subsystem by selectively activating one or more individual memory devices for access as part of the address range of the memory subsystem in isolation from other addressable on the same memory interface bus. In this manner many memory devices can share the same address, control, and data lines in the memory subsystem. Chip select lines can also be utilized in conjunction with external address decoders in a system if desired. However, in many cases a memory subsystem utilizes only the chip select lines to map individual memory device address ranges or portions of address ranges into the physical memory map that the memory subsystem presents. This allows the memory subsystem to utilize more complex decoding schemes without hardwired external decoding that can be programmable and/or change over time, such as with a virtual memory (VM) system or a memory management unit (MMU).

Memory interfaces/busses that utilize SDRAM's typically assign chip selects and/or physical memory address ranges in a manner that is based on the physical memory slot that the memory device is inserted into and not the type of memory being inserted/utilized or its contents. For example, a SDRAM memory module inserted into slot 0 of a SDRAM memory subsystem will be assigned to chip select 0 and chip select 1, the SDRAM memory module in slot 1 with be assigned chip selects 2 and 3, and so on. Furthermore, the number of physical SDRAM memory slots and their placement order is not generally specified in the SDRAM specification, so that the physical configuration and ordering of a SDRAM memory subsystem's SDRAM memory slots can differ from system to system. Because of this, a SDRAM memory that is placed into a physical SDRAM memory slot of the memory system cannot generally be guaranteed a specific memory address and chip select(s).

A problem with this is that to begin operation upon reset/power up, a PC or processor based system needs a method that is predictable to find the boot memory device. This has generally been achieved in the prior art by the placement of the boot memory device in a specific physical memory address range or by associating the boot memory with a specific chip select. For example, many PC's and other processor based systems utilize a boot memory that has a fixed memory address and/or a fixed "boot memory" chip select signal that activates the boot memory for access from the processor or memory controller (referred to herein as a memory controller). It is difficult to utilize a synchronous Flash memory device as such a boot memory device, however, because of the generally unpredictable assignment of chip select and physical memory address of a SDRAM memory slot of a SDRAM memory subsystem. The boot memory therefore cannot be guaranteed a specific chip select and/or address space without special consideration being taken, making synchronous Flash memories difficult to utilize as a boot memory device.

For the reasons stated above, and for other reasons stated below which will become apparent to those skilled in the art upon reading and understanding the present specification, there is a need in the art for a synchronous Flash memory device that can operate as a boot memory device in a SDRAM memory system without the assignment of a specific chip select or memory range.

SUMMARY OF THE INVENTION

The above-mentioned problems with boot memory device utilization in an SDRAM memory system and other problems are addressed by the present invention and will be understood by reading and studying the following specification.

In one embodiment, a synchronous non-volatile memory device comprises a synchronous memory interface, wherein the synchronous non-volatile memory device is adapted to respond indicating that it is a boot memory upon receiving an interrogation request at the synchronous memory interface.

In another embodiment, a synchronous Flash memory device comprises a synchronous memory interface with a chip select signal line, wherein the synchronous Flash memory device is adapted to assert an active signal on the chip select signal line upon receiving a reset signal.

In yet another embodiment, a synchronous Flash memory device comprises a synchronous memory interface with a chip select signal line, wherein the synchronous Flash memory device is adapted to assert an active signal on the chip select line upon receiving a predetermined combination of address, control, and data lines on the synchronous memory interface.

In a further embodiment, a synchronous Flash memory device comprises a synchronous memory interface, wherein the synchronous Flash memory device upon receiving a boot memory interrogation of a boot memory identification process that consists of a predetermined combination of asserted address, control, and data lines on the synchronous memory interface is adapted to assert one or more data values in a boot memory response.

In yet a further embodiment, a memory controller comprises a synchronous memory interface, wherein the memory controller is adapted to send an interrogation request through the synchronous memory interface to locate a boot memory device.

In another embodiment, a system comprises a memory controller, and one or more synchronous Flash memory devices coupled to the memory controller. At least one synchronous Flash memory device comprises a synchronous memory interface, wherein the synchronous Flash memory device is adapted to respond to an interrogation from the memory controller indicating that it is a boot memory upon receiving an interrogation request at the synchronous memory interface.

In yet another embodiment, a method of operating a system comprises sending a boot memory interrogation request from a memory controller, receiving the boot memory interrogation request at a non-volatile boot memory device, sending a boot memory response to the memory controller from the non-volatile boot memory device, and setting the non-volatile boot memory device as a boot memory in the memory controller.

In a further embodiment, a method of operating a synchronous Flash memory device comprises, receiving a boot memory interrogation request at a synchronous interface of the synchronous Flash memory device, and sending a boot memory identification response through the synchronous interface from the synchronous Flash memory device.

In yet a further embodiment, a method of operating a synchronous memory controller comprises sending an interrogation request at a synchronous interface of the synchronous memory controller, waiting for a boot memory response through the synchronous interface from a synchronous boot memory device indicating its location, and vectoring all further boot memory accesses to the located synchronous boot memory device.

In another embodiment, a method of identifying a boot memory device comprises sending a boot memory interrogation request from a memory controller, receiving the boot memory interrogation request at a non-volatile boot memory device, sending a boot memory response to the memory controller from the non-volatile boot memory device, and vectoring all further boot memory accesses to the non-volatile boot memory device after receiving its response.

In yet another embodiment, a synchronous Flash memory device comprises a synchronous memory interface with a chip select signal line. Wherein the synchronous Flash memory device is adapted to pull its chip select signal line from a first state to a second state in response to an interrogation of the device.

Other embodiments are also described and claimed.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

To better enable synchronous Flash memories to be utilized as boot memory, SDRAM memory subsystem embodiments of the present invention utilize a query/response protocol to identify a synchronous Flash boot memory inserted in a SDRAM memory subsystem. This allows synchronous Flash boot memories of embodiments of the present invention to be inserted in an arbitrary memory slot of the SDRAM memory subsystem. The query/response protocol also allows for differing boot memories to be selected from different synchronous Flash memories that have been inserted into a SDRAM memory subsystem by selecting a synchronous Flash memory to boot from and programming it to indicate that it is the boot memory upon system restart. In one embodiment, a synchronous Flash memory of a SDRAM memory subsystem indicates that it is a boot memory to the memory controller by pulling its chip select low after the receipt of an active reset signal from the memory controller or system. In one embodiment of the present invention, a synchronous Flash memory of a SDRAM memory subsystem indicates that it is a boot memory to the memory controller by pulling its chip select low for a selected time period after the receipt of a predetermined combination of signals on its address, data, and control lines from the memory controller or system. In another embodiment of the present invention, a synchronous Flash memory of a SDRAM memory subsystem indicates that it is a boot memory to the memory controller by placing a predetermined data code or data code sequence on the data lines after the receipt of a predetermined combination of signals on its address, data, and control lines from the memory controller or system.

Figure 1A:
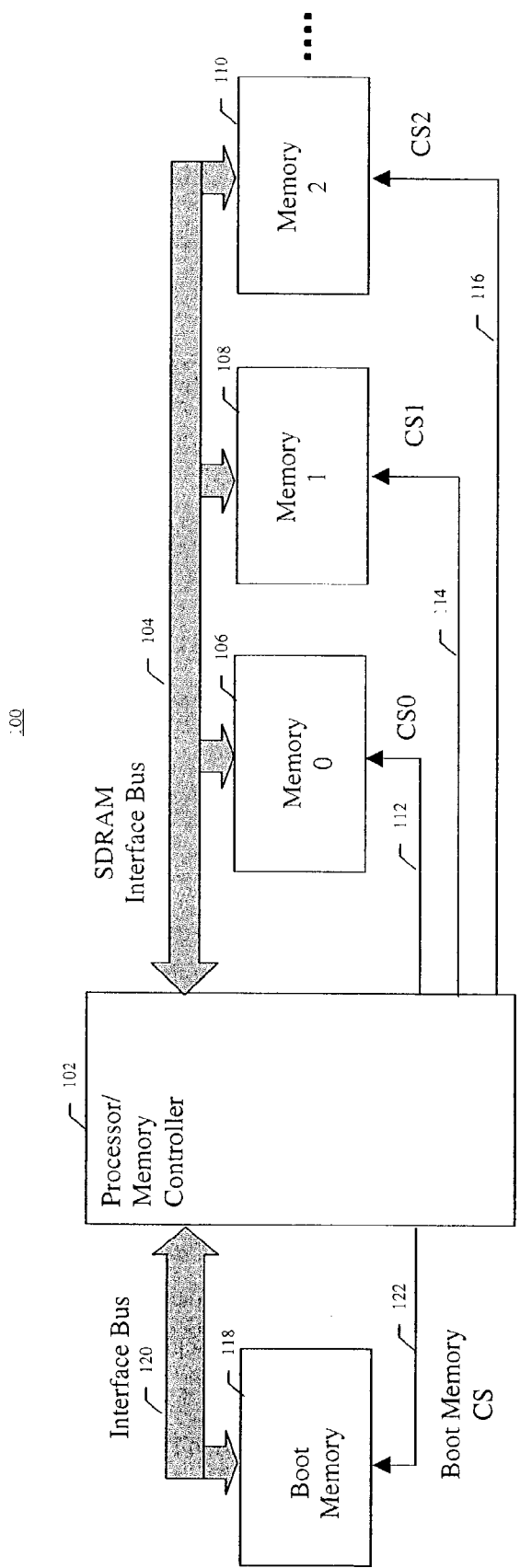
FIG. 1A details a system with a boot memory of the prior art.

FIG. 1A shows a system 100 of the prior art, including a memory controller 102 (also known as a host controller), a SDRAM interface memory bus 104 containing address, data, and control lines, and one or more synchronous memories (SDRAM or DDR-SDRAM) 106, 108, 110. Each SDRAM memory device 106, 108, 110 on the SDRAM interface memory bus 104 is coupled to a chip select line 112, 114, 116. A separate non-volatile memory device 118 is coupled by its own interface bus 120 containing address, data, and control lines, to operate as the boot memory of the system 100. The boot memory device 118 has a specifically assigned boot memory chip select 122 and/or resides at a given address of the physical memory address range of the system 100, allowing the system 100 to predictably access the boot code contained on the boot memory 118 upon reset or start up of the system 100. It is noted that the memory controller 102 in many systems 100 can include, but is not limited to, a processor, a special purpose memory management chip, and/or an integrated chipset.

The chip select lines 112, 114, 116 of the one or more synchronous memories (SDRAM or DDR-SDRAM) 106, 108, 110 are position dependent in the system 100 of FIG. 1A. For example, memory 0 106 is coupled to chip select 0 (CS0) 112, memory 1 108 is coupled to chip select 1 (CS1) 112, the memory 2 110 is coupled to chip select 2 (CS0) 116, and so forth. Physically, the chip selects in a SDRAM system are generally assigned in pairs to each physical memory slot of the system 100. For example, CS0 112 and CS1 114 are both assigned to the memory module (not shown) present in memory slot 0 (not shown), such that synchronous memories 0 and 1 106, 108 both reside on the same physical memory module.

At reset or power up the system 100 of FIG. 1A resets all devices and selects the boot memory 118 by activating the boot memory chip select 122. The system 100 then reads the boot code software routines from the boot memory's interface bus 120 and executes the initial boot code vector. This bootstraps and initializes the system 100 and starts the loading and execution of the main operating system or executable on the system 100. Once in operation, the system 100 of FIG. 1A access the synchronous memory by utilizing the chip select lines 112, 114, 116 and of the SDRAM interface memory bus 104. Additionally, further accesses to the boot memory to reference different sections of the contained boot code or BIOS by the system 100 are possible utilizing the boot memory's interface bus 120 and the boot memory chip select 122.

It is noted that the boot memory 118 may not be on a separate interface bus 120 and can reside on the same interface memory bus 104 as the synchronous memories and/or utilize some or all of the same address, data, and control lines. However, a boot memory 118 in this situation still utilizes a fixed chip select line and/or address range.

Figure 1B:
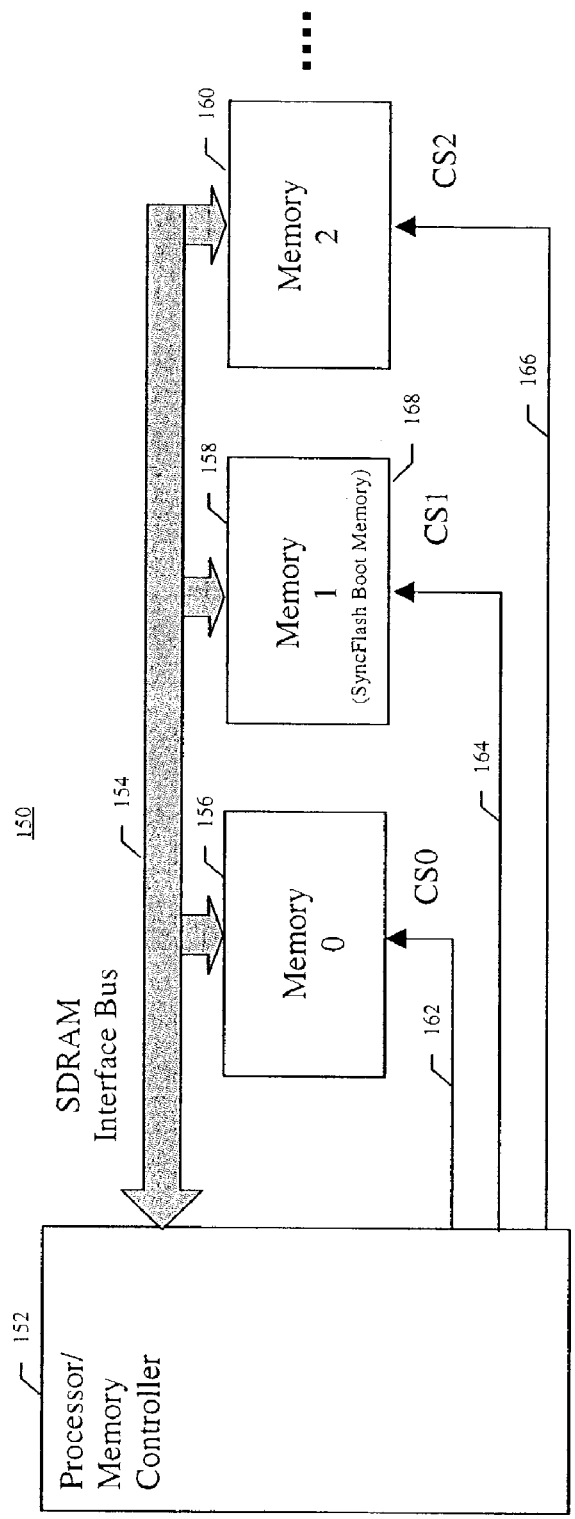
FIG. 1B details a system with a synchronous Flash boot memory in accordance with an embodiment of the present invention.

FIG. 1B shows a system 150 embodiment of the present invention. In FIG. 1B, the system 150 includes a memory controller 152, a SDRAM interface memory bus 154 containing address, data, and control lines, and one or more synchronous memories (SDRAM or DDR-SDRAM) 156, 158, 160. Each SDRAM memory device 156, 158, 160 on the SDRAM interface memory bus 154 is coupled to a chip select line 162, 164, 166. The chip select lines 162, 164, 166 of the one or more synchronous memories (SDRAM or DDR-SDRAM) 156,158, 160 are typically position dependent in the system 150 of FIG. 1B. For example, memory 0 156 is coupled to chip select 0 (CS0) 162, memory 1 158 is coupled to chip select 1 (CS1) 162, the memory 2 160 is coupled to chip select 2 (CS0) 166, and so forth.

In the system 150 of FIG. 1B, a synchronous Flash memory 168 is utilized as the boot memory, instead of a separate non-volatile boot memory device with its own interface bus and/or a specifically assigned boot memory chip select. The synchronous Flash boot memory 168 is situated as memory device 1 158 of the system 150 and is coupled to CS1 164. However, the synchronous Flash boot memory 168 in embodiments of the present invention can be placed in any memory position/slot of the SDRAM memory interface of the system 150 of FIG. 1B and can be coupled to any chip select 162, 164, 166. This is because the synchronous Flash boot memory 168 will identify itself as a boot memory to the system 150 and/or the memory controller 152. Thus, a system 150 having a synchronous Flash boot memory 168 embodiment of the present invention can predictably access the boot code software routines contained on the synchronous Flash boot memory 168 upon reset or start up of the system 150 and properly vector the boot to the boot memory 168 without a fixed chip select and/or memory address.

Synchronous Flash boot memory 168 embodiments of the present invention identify themselves to the memory controller 152 of the system 150 that they are installed into during reset, power up, or upon receiving a special SDRAM command sequence. This is done by a query/response process in which the memory controller 152 and/or system 150 interrogates the SDRAM system interface bus 154 and/or the chip select lines 162, 164, 166 and that the synchronous Flash boot memory identifies itself to the memory controller 152 by responding in a proscribed manner on the SDRAM system interface bus 154 and/or the chip select lines 162, 164, 166. Typically the memory controller 152 and/or system 150 is adapted to interrogate the SDRAM system interface bus 154 and/or the chip select lines 162, 164, 166 when a system 150 start up or reset has occurred.

In one memory controller 152/system 150 embodiment of the present invention, the set of chip select lines 162, 164, 166 on the SDRAM interface bus 154 are bi-directional and are pulled high when not actively driven. Interrogation then takes the form of a reset signal being delivered to the synchronous memory devices 156, 158, 160 inserted into the SDRAM interface bus 154 and the chip select line 162, 164, 166 being released and allowed to be pulled high. The synchronous Flash boot memory 168 responds by pulling its associated chip select line 164 low to identify itself and its associated chip select to the memory controller 152 as being a boot memory. In this manner the boot memory 168 and its associated chip select are identified to the memory controller 152 no matter where the synchronous Flash boot memory 168 has been inserted in the SDRAM interface bus 154. This allows the memory controller 152 to reliably vector the system 150 to the synchronous Flash boot memory 168 during power up or system reset and begin loading and executing the contained boot code. The chip select lines 162, 164, 166 can be pulled up by a variety of methods, these methods include, but are not limited to, pulling up the chip select lines 162, 164, 166 by use of pull up resistors, open collector driver circuits, or use of a weak pull up transistor. It is noted that the logic of the chip select lines 162, 164, 166 can be inverted where the chip select lines 162, 164, 166 are pulled low when released and then pulled high by the responding synchronous Flash boot memory 168.

Figure 2:
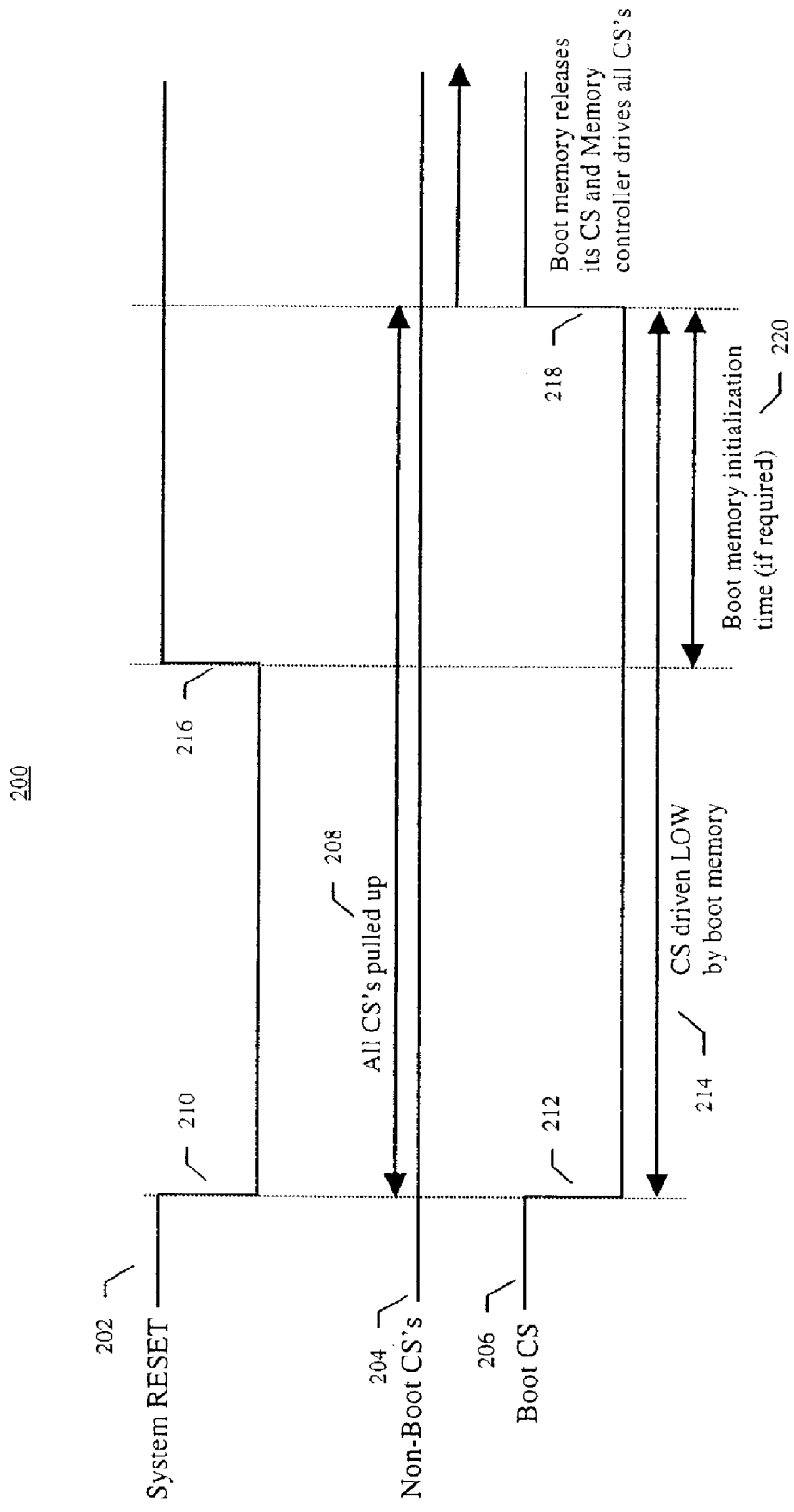
FIG. 2 details a control signal waveform of a system with a synchronous Flash boot memory in accordance with an embodiment of the present invention.

Shown in FIG. 2 is an illustration of a waveform 200 of this embodiment of the present invention showing reset 202 in relation to the bi-directional chip select signals 204, 206. In FIG. 2, upon power up or system reset, the chip select lines 204, 206 are released by the memory controller 152 and are pulled high 208. When the reset signal line becomes active (low) 210, the synchronous Flash boot memory 168 embodiment of the present invention pulls low 212 its chip select line 206. The boot memory chip select line is then kept low while reset is active 214 to indicate to the memory controller 152 that the synchronous memory coupled to the pulled low chip select line 206 is the boot memory 168. When the reset line is released 216, the boot memory chip select 206 is released 218 by the synchronous Flash boot memory device 168 and the memory controller begins to drive all chip select lines 204, 206 to operate the memory subsystem. It is noted that the boot memory chip select signal 206 can be held low for an additional time period 220 by the synchronous Flash boot memory 168 after release of the reset signal 216 to allow for completion of its internal initialization cycle or other such delay if desired.

In another memory controller 152/system 150 embodiment of the present invention, the chip select lines 162, 164, 166 on the SDRAM interface bus 154 are also bi-directional and pulled high when not actively driven. Interrogation then takes the form of a predetermined combination of control, address, and/or data line signals being delivered to the synchronous memory devices 156, 158, 160 inserted into the SDRAM interface bus 154 and the chip select line 162, 164, 166 being released and allowed to be pulled high. The synchronous Flash boot memory 168 then responds by pulling its associated chip select line 164 low to identify itself to the memory controller 152 as a boot memory.

Figure 3:
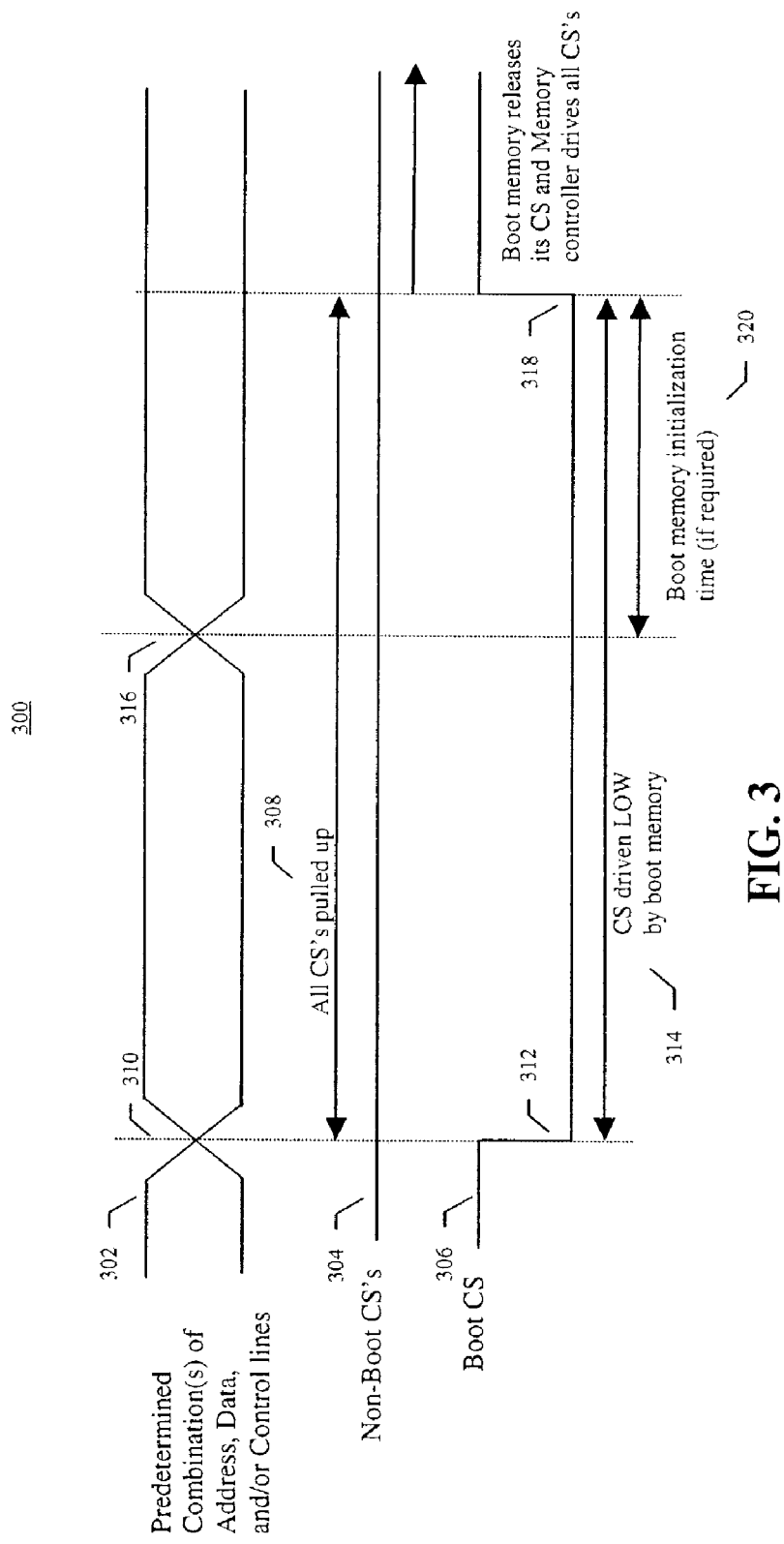
FIG. 3 details a control signal waveform of a system with a synchronous Flash boot memory in accordance with another embodiment of the present invention.

Shown in FIG. 3 is an illustration of a waveform 300 of this embodiment of the present invention showing the selected combination of control, address, and/or data line signals 302 in relation to the bi-directional chip select signals 304, 306. In FIG. 3, during boot memory identification, the chip select lines 304, 306 are released by the memory controller 152 and are pulled high 308. When the selected combination of control, address, and/or data line signals 302 are asserted 310, the synchronous Flash boot memory 168 embodiment of the present invention pulls low 312 its chip select line 306. The boot memory chip select line is then kept low while the control, address, and/or data line signals 302 are active 314 to indicate to the memory controller 152 that the synchronous memory coupled to the pulled low chip select line 306 is the boot memory 168. When the control, address, and/or data line signals 302 are released 316 by the memory controller 152, the boot memory chip select 306 is released 318 by the synchronous Flash boot memory device 168 and the memory controller begins to drive all chip select lines 304, 306 to operate the memory subsystem. It is noted that the boot memory chip select signal 306 can also be held low for an additional time period 320 by the synchronous Flash boot memory 168 after release of the selected combination of control, address, and/or data line signals 316 to allow for completion of its internal initialization cycle.

In a further embodiment of the present invention, the memory controller 152/system 150 interrogation also takes the form of a predetermined combination of control and/or address line signals being delivered to the synchronous memory devices 156, 158, 160 inserted into the SDRAM interface bus 154. The synchronous Flash boot memory 168 then responds by asserting a predetermined combination of its control and/or data line signals to identify itself and its address/chip select to the memory controller 152 as a boot memory. Alternatively, the synchronous Flash boot memory 168 can respond by placing one or more data values on the data bus to identify itself as a boot memory and its location to the memory controller 152. These data values or "tokens" are stored by the synchronous Flash boot memory 168 for use in the boot memory identification process. In one embodiment, a special purpose register or memory area (not shown) of the synchronous Flash boot memory 168 is provided to store the boot memory data values until required by the boot memory identification process.

Figure 4:
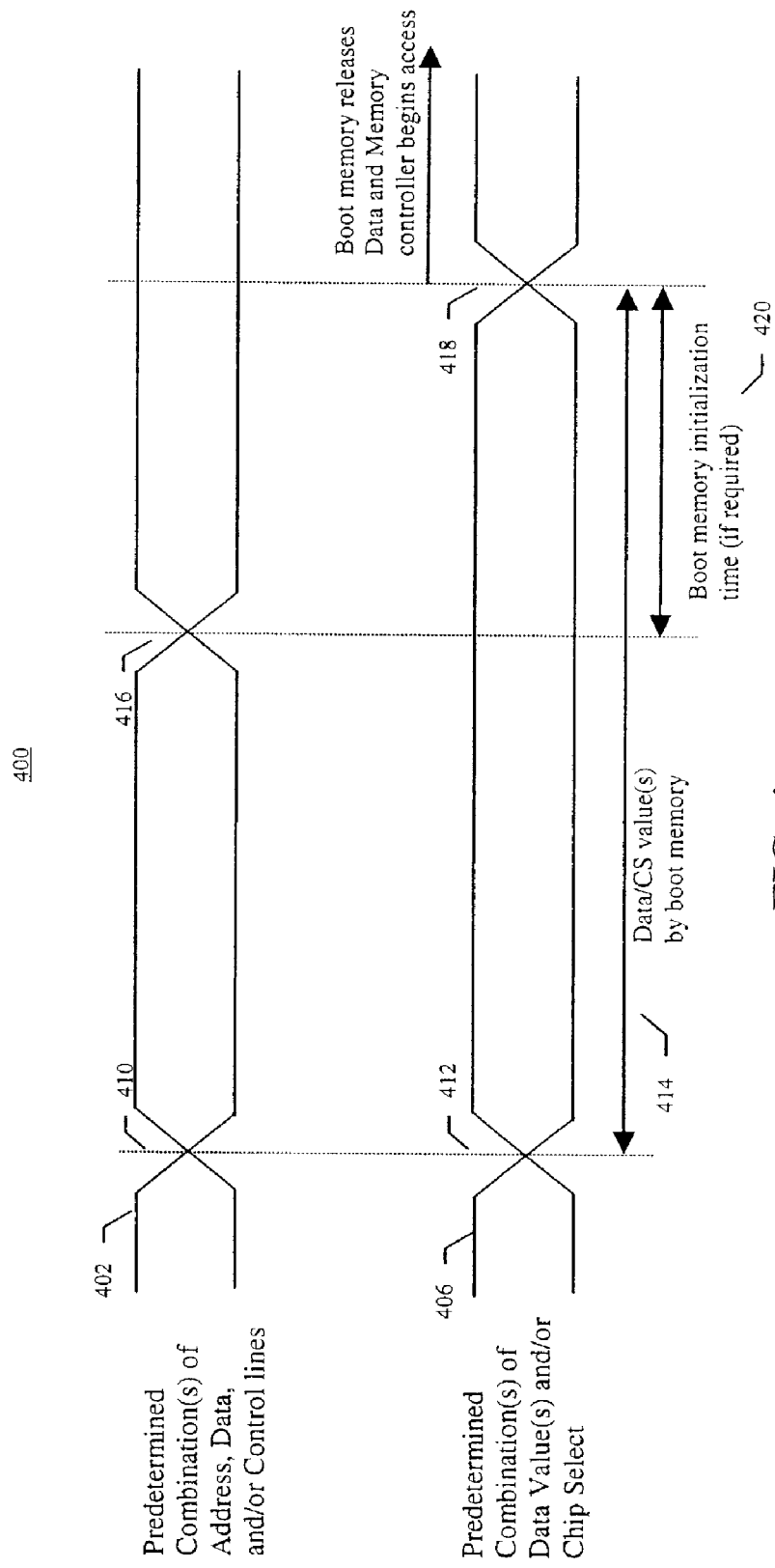
FIG. 4 details a control signal waveform of a system with a synchronous Flash boot memory in accordance with another embodiment of the present invention.

Shown in FIG. 4 is an illustration of a waveform 400 of this embodiment of the present invention showing the predetermined combination of control and/or address line signals 402 in relation to the data line and/or chip select line signals 406. In FIG. 4, during boot memory identification, a selected combination of control and/or address line signals 402 are asserted 410 by the memory controller 152. In response, the synchronous Flash boot memory 168 embodiment of the present invention asserts 412 one or more selected data values and/or its chip select line 414 to identify the boot memory 168, its address range, and/or its chip select. When the control and/or address line signals 402 asserted by the memory controller 152 are released 416, the synchronous Flash boot memory 168 releases 418 its asserted data value(s) and/or chip select line 406 and the memory controller 152 begins operation of the memory subsystem. It is noted that the asserted data value(s) and/or chip select line 406 can be held low for an additional time period 420 by the synchronous Flash boot memory 168 if desired after release of the selected combination of control and/or address line signals 416 to allow for completion of its internal initialization cycle. It is also noted that the one or more data values/tokens from the synchronous Flash boot memory 168 can be communicated to the memory controller 152 serially down a bi-directional chip select line, a data line, and/or other appropriate control line.

In one synchronous Flash embodiment of the present invention, a synchronous Flash memory device can be rewriteably programmed to indicate to the memory controller that it is a boot memory device utilizing one or more of the above methods. This allows two or more synchronous Flash memory devices installed in the same system 150 to exchange their roles as the boot memory device for the system 150. With this ability, multiple differing systems, BIOS images, or embedded executables can be installed in a single system 150 on different synchronous Flash memory devices and changed by simply programming which synchronous Flash is to be the active boot memory upon reboot. A redundant synchronous Flash boot memory can also be provided with this method for high reliability fault tolerant systems and swapped in by programming which synchronous Flash memory is to be the active boot memory to allow for a boot memory back up.

It is noted that other apparatus and/or methods of identifying a boot memory on a synchronous memory bus with synchronous Flash memory embodiments of the present invention are possible and should be apparent to those skilled in the art with benefit of the present disclosure.

CONCLUSION

A synchronous Flash memory device has been detailed that enhances initialization and boot memory device identification in synchronous memory systems. Boot memories are typically a separate device that is tied to a specific chip select line and/or address range of a system, whereas synchronous SDRAM memory generally can be placed in any available memory slot and assigned one of several possible chip selects and address ranges. This lack of predictability makes installing a boot memory based on a non-volatile synchronous memory device difficult. A synchronous Flash boot memory device of the detailed invention identifies itself and its chip select/address range to the memory controller of the SDRAM system at power up, reset, or upon receiving an identification request. This allows the utilization of the synchronous Flash memory as a boot memory in synchronous systems where a reserved boot memory slot and/or chip select are not provided.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A synchronous non-volatile memory device comprising:
a synchronous memory interface, wherein the synchronous non-volatile memory device is adapted to actively respond indicating that it is a boot memory upon receiving a boot memory interrogation request at the synchronous memory interface, wherein the synchronous non-volatile memory device actively responds, asserting a boot memory response only after receiving the boot memory interrogation request.

2. The synchronous non-volatile memory device of claim 1, wherein the synchronous memory interface has one or more chip select lines.

3. The synchronous non-volatile memory device of claim 2, wherein the one or more chip select lines are pulled up when not actively driven.

4. The synchronous non-volatile memory device of claim 2, wherein the one or more chip select lines are bi-directional.

5. The synchronous non-volatile memory device of claim 1, wherein the boot memory interrogation request is a reset.

6. The synchronous non-volatile memory device of claim 1, wherein the boot memory interrogation request is made via the assertion of a selected combination of address, control, and data lines.

7. The synchronous non-volatile memory device of claim 1, wherein the boot memory interrogation request is made via the assertion of an SDRAM command.

8. The synchronous non-volatile memory device of claim 1, wherein the boot memory response is an asserted chip select line.

9. The synchronous non-volatile memory device of claim 1, wherein the boot memory response is a combination of one or more asserted data lines and a chip select line.

10. The synchronous non-volatile memory device of claim 1, wherein the boot memory response is one or more data values.

11. The synchronous non-volatile memory device of claim 10, wherein the one or more data values are placed on a data bus.

12. The synchronous non-volatile memory device of claim 10, wherein the one or more data values are communicated serially down a control line of the synchronous interface.

13. The synchronous non-volatile memory device of claim 10, wherein the one or more data values contain an address range of the boot memory.

14. The synchronous non-volatile memory device of claim 1, wherein the synchronous non-volatile memory is adapted to programmably set its status as an active boot memory.

15. The synchronous non-volatile memory device of claim 1, wherein the synchronous interface is an SDRAM or a DDR-SDRAM compatible interface.

16. The synchronous non-volatile memory device of claim 1, wherein the synchronous non-volatile memory device is a synchronous Flash memory device.

17. A synchronous Flash memory device comprising:
a synchronous memory interface with a chip select signal line, wherein the synchronous Flash memory device is adapted to assert an active boot memory response signal on the chip select signal line upon receiving a reset signal, wherein the synchronous Flash memory device asserts the active boot memory response signal on the chip select signal line only after receiving the reset signal.

18. The synchronous Flash memory device of claim 17, wherein the chip select signal line is bi-directional.

19. The synchronous Flash memory device of claim 18, wherein one or more data values are communicated serially down the bi-directional chip select signal line of the synchronous interface in the boot memory response signal.

20. The synchronous Flash memory device of claim 19, wherein the one or more data values contain an address range of the synchronous Flash memory device.

21. The synchronous Flash memory device of claim 17, wherein the synchronous Flash memory device is adapted to programmably set its status as an active boot memory.

22. The synchronous Flash memory device of claim 17, wherein the synchronous memory interface is an SDRAM or a DDR-SDRAM compatible interface.

23. A synchronous Flash memory device comprising:
a synchronous memory interface with a chip select signal line, wherein the synchronous Flash memory device is adapted to assert an active boot memory response signal on the chip select signal line upon receiving a boot memory interrogation request made via a predetermined combination of asserted address, control, and data lines on the synchronous memory interface, wherein the synchronous Flash memory device asserts the active boot memory response signal on the chip select signal line only after receiving the boot memory interrogation request made via the predetermined combination of asserted address, control, and data lines on the synchronous memory interface.

24. The synchronous Flash memory device of claim 23, wherein the chip select signal line is bi-directional.

25. The synchronous Flash memory device of claim 23, wherein the synchronous Flash memory device is adapted to programmably set its status as an active boot memory.

26. The synchronous Flash memory device of claim 23, wherein the synchronous memory interface is an SDRAM or a DDR-SDRAM compatible interface.

27. A synchronous Flash memory device comprising:
a synchronous memory interface, wherein the synchronous Flash memory device upon receiving a boot memory interrogation of a boot memory identification process is adapted to assert one or more data values in a boot memory response, wherein the boot memory interrogation consists of the assertion of a predetermined combination of address, control, and data lines on the synchronous memory interface, and wherein the synchronous Flash memory device responds by asserting the one or more data values in a boot memory response only after receiving the predetermined combination of asserted address, control, and data lines of the boot memory interrogation on the synchronous memory interface.

28. The synchronous Flash memory device of claim 27, wherein the synchronous Flash memory device is adapted to additionally assert a chip select signal line upon receiving the boot memory interrogation consisting of the assertion of the predetermined combination of address, control, and data lines on the synchronous memory interface.

29. The synchronous Flash memory device of claim 28, wherein the one or more data values of the boot memory response are placed on a data bus.

30. The synchronous Flash memory device of claim 28, wherein the one or more data values of the boot memory response are communicated serially down a control line of the synchronous interface.

31. The synchronous Flash memory device of claim 28, wherein the one or more data values of the boot memory response contain an address range of the boot memory.

32. The synchronous Flash memory device of claim 27, wherein the synchronous Flash memory device is adapted to programmably set its status as an active boot memory.

33. A memory controller comprising:
a synchronous memory interface, wherein the memory controller is adapted to send a boot memory interrogation request through the synchronous memory interface to locate a boot memory device, wherein the boot memory device is adapted to actively respond with a boot memory response only after receiving the boot memory interrogation request.

34. The memory controller of claim 33, wherein the memory controller is adapted to send a boot memory interrogation request to locate a boot memory device at reset.

35. The memory controller of claim 33, wherein the memory controller is adapted to send a boot memory interrogation request to locate a boot memory device at power up.

36. The memory controller of claim 33, wherein the synchronous memory interface has one or more chip select lines.

37. The memory controller of claim 36, wherein, during normal operation, the one or more chip select lines are pulled up when not actively driven.

38. The memory controller of claim 36, wherein the one or more chip select lines are bi-directional.

39. The memory controller of claim 33, wherein the interrogation request is a reset command.

40. The memory controller of claim 33, wherein the boot memory interrogation request is made via the assertion of a selected combination of one or more address, control, and data lines.

41. The memory controller of claim 33, wherein the memory controller is adapted to receive a boot memory response from the boot memory device.

42. The memory controller of claim 41, wherein the boot memory response is an asserted chip select line.

43. The memory controller of claim 41, wherein the boot memory response is a combination of one or more asserted data lines and a chip select line.

44. The memory controller of claim 41, wherein the boot memory response is one or more data values.

45. A system comprising:
a memory controller; and
one or more synchronous Flash memory devices coupled to the memory controller, wherein at least one synchronous Flash memory device comprises,
a synchronous memory interface, wherein the synchronous Flash memory device is adapted to actively respond with a boot memory response to a boot memory interrogation from the memory controller indicating that it is a boot memory upon receiving the boot memory interrogation request at the synchronous memory interface, wherein the synchronous Flash memory device actively responds with the boot memory response only after receiving the boot memory interrogation request.

46. The system of claim 45, wherein the at least one synchronous Flash memory contains BIOS code.

47. The system of claim 45, wherein the at least one synchronous Flash memory contains boot code.

48. The system of claim 45, wherein the memory controller comprises a processor or an integrated chipset.

49. The system of claim 45, wherein the at least one synchronous Flash memory is adapted to programmably set its status as an active boot memory.

50. The system of claim 45, wherein the system has a plurality of synchronous Flash memory devices that can be selectively programmed to set one synchronous Flash memory device as a boot memory at a time.

51. The system of claim 50, wherein the plurality of synchronous Flash memory devices store the same software routines.

52. The system of claim 50, wherein the plurality of synchronous Flash memory devices store different software routines.

53. A method of operating a system comprising:
sending a boot memory interrogation request from a memory controller;
receiving the boot memory interrogation request at a non-volatile boot memory device;
sending an active boot memory response to the memory controller from the non-volatile boot memory device, wherein the active boot memory response is sent only after receiving the boot memory interrogation request; and
setting the non-volatile boot memory device as a boot memory in the memory controller.

54. The method of claim 53, further comprising:
accessing the boot memory device with the memory controller to execute boot code stored on the non-volatile boot memory device.

55. The method of claim 53, wherein the memory controller is a synchronous memory controller.

56. The method of claim 53, wherein the non-volatile boot memory device is a synchronous non-volatile boot memory device.

57. The method of claim 53, wherein the memory controller comprises one of a processor and an integrated chipset.

58. The method of claim 53, further comprising:
programming the non-volatile boot memory device to set its status as an active boot memory.

59. The method of claim 53, further comprising:
selectively programming one non-volatile boot memory device of a plurality of non-volatile boot memory devices as an active boot memory.

60. A method of operating a synchronous Flash memory device comprising:
receiving a boot memory identification interrogation request at a synchronous interface of the synchronous Flash memory device; and
sending an active boot memory identification response through the synchronous interface from the synchronous Flash memory device, wherein the active boot memory identification response is sent only after receiving the boot memory identification interrogation request.

61. The method of claim 60, wherein receiving a boot memory identification interrogation request further comprises receiving a reset signal.

62. The method of claim 60, wherein receiving a boot memory identification interrogation request further comprises receiving the boot memory identification interrogation request via the assertion of a selected combination of active address, control, and data signals.

63. The method of claim 60, wherein sending an active boot memory identification response further comprises asserting an active chip select signal.

64. The method of claim 60, wherein sending an active boot memory identification response further comprises sending one or more data values.

65. The method of claim 64, wherein sending one or more data values further comprises sending one or more data values over a data bus of the synchronous interface.

66. The method of claim 64, wherein sending one or more data values further comprises sending one or more data values serially over a control line of the synchronous interface.

67. A method of operating a synchronous memory controller comprising:
sending a boot memory interrogation request at a synchronous interface of the synchronous memory controller;
waiting for an active boot memory response through the synchronous interface from a synchronous boot memory device indicating its location, wherein the synchronous boot memory device actively responds with the boot memory response only after receiving the boot memory interrogation request; and
vectoring all further boot memory accesses to the located synchronous boot memory device.

68. The method of claim 67, wherein sending a boot memory interrogation request further comprises sending a reset signal.

69. The method of claim 67, wherein sending a boot memory interrogation request further comprises sending a boot memory interrogation request via the assertion of a selected combination of one or more active address, control, and data signals.

70. The method of claim 67, wherein waiting for an active boot memory response further comprises waiting for an active chip select signal on a bi-directional chip select line.

71. The method of claim 67, wherein waiting for an active boot memory response further comprises waiting for one or more data values.

72. A method of identifying a boot memory device comprising:
sending a boot memory interrogation request from a memory controller;
receiving the boot memory interrogation request at a non-volatile boot memory device;
sending an active boot memory response to the memory controller from the non-volatile boot memory device, wherein the non-volatile boot memory device actively responds with the active boot memory response only after receiving the boot memory interrogation request; and
vectoring all further boot memory accesses to the non-volatile boot memory device after receiving its response.

73. The method of claim 72, wherein sending an interrogation request further comprises sending a reset signal.

74. The method of claim 72, wherein sending an interrogation request further comprises sending an interrogation request via the assertion of a selected combination of one or more active address, control, and data signals.

75. The method of claim 72, wherein sending an active boot memory response further comprises sending an active chip select signal on a bi-directional chip select line.

76. The method of claim 72, wherein sending an active boot memory response further comprises sending one or more data values.

77. The method of claim 72, wherein the memory device is a non-volatile memory device.

78. The method of claim 77, wherein the non-volatile memory device is a synchronous Flash memory device.

79. The method of claim 72, wherein vectoring all further boot memory accesses to the non-volatile boot memory device further comprises vectoring all further boot memory accesses to an active non-volatile boot memory device of a plurality of non-volatile boot memory devices.

80. The method of claim 79, further comprising:
    programming a selected non-volatile boot memory device of the plurality of non-volatile boot memory devices to be an active non-volatile boot memory device.

81. A synchronous Flash memory device comprising:
    a synchronous memory interface with a chip select signal line, wherein the synchronous Flash memory device is adapted to actively pull its chip select signal line from a first state to a second state in an active boot memory response to a boot memory interrogation of the device, wherein the synchronous Flash memory device actively pulls its chip select line from the first state to the second state only after receiving the interrogation request.

82. The synchronous Flash memory device of claim 81, wherein the chip select signal line is bi-directional.

83. The synchronous Flash memory device of claim 81, wherein the interrogation is a reset signal.

84. The synchronous Flash memory device of claim 81, wherein the interrogation is made via the assertion of a predetermined combination of active address, control, and data signals.

85. The synchronous Flash memory device of claim 81, wherein the synchronous Flash memory device is adapted to programmably set its status as an active boot memory.

86. The synchronous Flash memory device of claim 81, wherein the synchronous memory interface is an SDRAM or a DDR-SDRAM compatible interface.

* * * * *